Sept. 24, 1935.  J. LOUMIET ET LAVIGNE  2,015,076
CENTRIFUGAL SEPARATOR
Filed Oct. 10, 1933
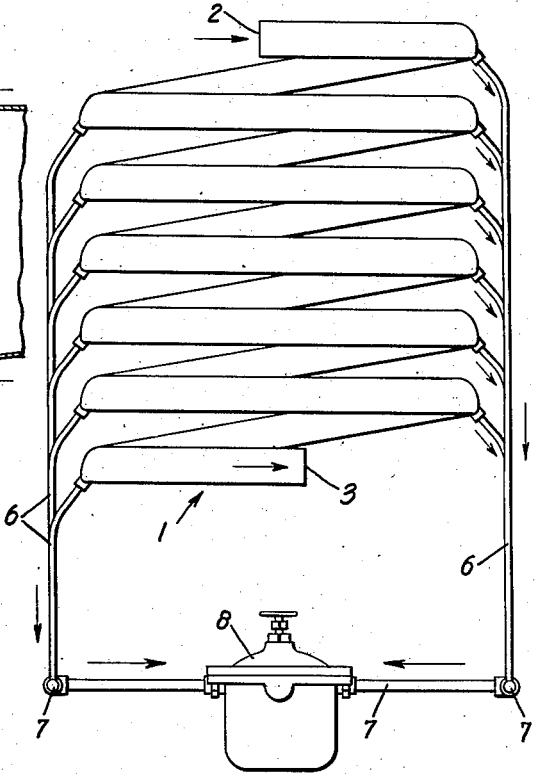
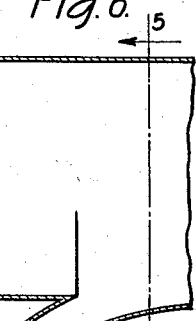
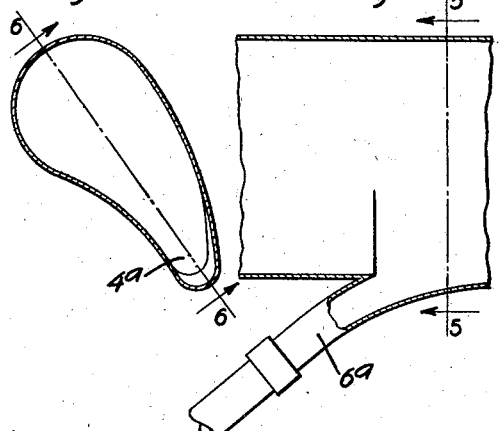
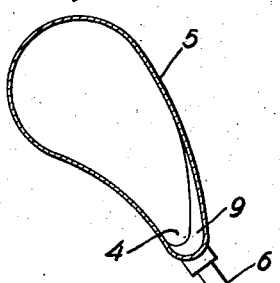
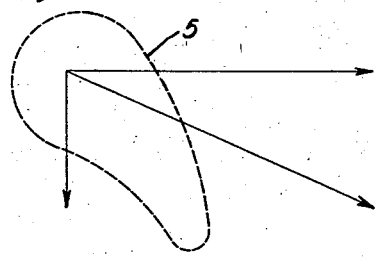
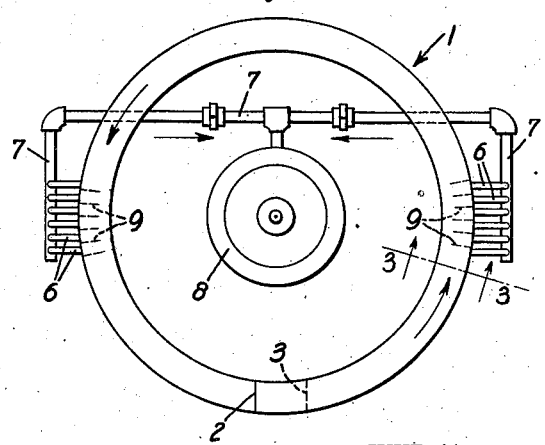
INVENTORS
Jean Loumiet et Lavigne.
BY Moses & Nolte
ATTORNEYS Patented Sept. 24, 1935

2,015,076

UNITED STATES PATENT OFFICE 2,015,076

CENTRIFUGAL SEPARATOR

Jean Loumiet et Lavigne, Playa de la Teja, Itabo, Cuba

Application October 10, 1933, Serial No. 692,947
In Cuba April 25, 1933

6 Claims. (Cl. 183—82)

This invention relates to the separation of fluids and has for an object to contrive means for separating fluids in an efficient, thorough and economical manner. The invention is illustrated and described herein as applied to the separation of lubricating oil from the exhaust steam of engines, but it is to be understood that features of the invention are also useful in the separation of liquids or solids from liquids, and in the separation of solids from gases or vapors.

It is a feature of the invention that the fluids to be separated are caused to travel through a spiral, desirably of helical form. Such travel of the fluids develops centrifugal force which tends to effect a separation of the heavier liquid particles from the lighter steam. The velocity of the fluid through the coil may be controlled to produce centrifugal force of any magnitude desired so that the separation of the fluids may be performed efficiently. As a result of the combined effect of gravity and centrifugal force, the liquid particles which are of higher density are caused to accumulate along the outer, lower side of the coil. It is a feature of the present invention that the coil is made of tapering cross-section toward the lower outer side thereof to provide a trough of restricted area for the collection of the liquid.

A further feature of the invention consists in withdrawing the denser fluid at successive points during the course of its travel while allowing the lighter fluid to continue its movement inside the coil. The separation or purification of the lighter fluid takes place in such a way that substantially the same percentage of denser fluid is separated at each withdrawal and consequently the effect of purification of the lighter fluid multiplies itself. For example, if each partial withdrawal has the effect of removing 70% of the denser fluid contained in the mixture, the amount of the denser fluid remaining after the first withdrawal will be 30% of the original content. After the second withdrawal the denser fluid in the mixture is reduced to 30% of 30% i. e.— 9% of the original content. After the third withdrawal this is reduced to 30% of 30% of 30% i. e.—2.7% of the original content and so on, in direct geometric progression. This means that a substantially perfect purification is obtained very rapidly.

Other objects and advantages will hereinafter appear.

In the drawing forming part of this specification

Figure 1 is a view in elevation of a separating apparatus embodying features of the invention;

Figure 2 is a plan view of the apparatus of Figure 1;

Figure 3 is a fragmentary sectional view taken on line 3—3 of Figure 2 looking in the direction of the arrows;

Figure 4 is a diagrammatic view similar to Figure 3 illustrating the direction of the force acting upon the denser fluid, in relation to the shape of the coil;

Figure 5 is a sectional view, similar to Figure 3, taken on the line 5—5 of Figure 6 and illustrating a further embodiment of the invention; and Figure 6 is a longitudinal sectional view taken on the line 6—6 of Figure 5 looking in the direction of the arrows.

In Figures 1 and 2 the separator is illustrated as comprising a helical coil 1 which extends downward from the intake end 2 to the discharge end 3. The steam having oil particles entrained therein may be forced through the coil under pressure or it may be drawn through by a suction pump. The coil 1 has a section which is not circular; the cross-sectional shape being determined in each case to meet the needs of the particular problem of separation. The coil includes at the lower, outer side thereof a restricted portion 4 which forms a channel or trough of limited cross-section for the collection of the denser fluid.

The denser fluid is subjected to two forces; first, the force of gravity; and second, the centrifugal force. The latter force depends for its strength upon the density and speed of the fluid and the radius of the coil. The resultant of these two forces, as is shown in Figure 4, determines the direction of the movement of the denser fluid relative to the lighter fluid.

It is convenient and desirable that the outer downwardly inclined wall 5 of the coil cross the direction of this resultant force at an acute angle for a reason which will now be explained.

If the outer wall 5 extended parallel to the resultant of gravity and centrifugal force, it would offer no obstruction to the movement of the denser fluid. On the other hand, no advantage would be taken of the fact that the small drops of the denser fluid adhere by capillary force to the outer section of the wall when they are projected against it. In order to take advantage of the latter factor or of separation in addition to other forces above-mentioned, it is preferable that the outer wall of the section of the coil cross the resultant of gravity and centrifugal force.

The exact inclination of the wall 5 is selected according to the nature of the separation that is desired to be made and may be determined in each case.

The denser fluid flows in the trough 4 and also adheres to the wall 5, being carried forward by the force of gravity and by the travel of the fluid in the coil. For this reason it is convenient that the travel of the fluid in the coil should be in a downward direction so that the travel of the fluid may supplement and not oppose the action of gravity upon the separated liquid.

The withdrawal of the denser fluid is effected by means of drain pipes 6, all of which connect with conduits 7 that deliver into a steam trap 8. The collected liquid is discharged from the steam trap 8 but the steam cannot pass through or escape from it.

Each of the drain pipes 6 is connected to the bottom of the trough 4 and conducts the separated liquid downward by gravity.

Immediately after the connection of each drain pipe 6 with the trough 4 there is a baffle 9 inside the coil 1. The baffle 9 may be flat or slightly curved. It lies generally in a plane at right angles to the axis of the coil, but its face which stands in obstructing relation to the travel of the liquid in the trough 4 is inclined so that when looked at from exterior toward interior it forms an obtuse angle with the flow of the fluid. This baffle cuts across part of the section of the coil that forms the trough 4 with a diminishing extension along the outer wall 5 of the shape illustrated in the drawing in Figure 3. The baffle impedes the passing of the liquid separated in the preceding stretch of the coil and tends to divert and accumulate at the mouth of the drain pipe the liquid which is sliding along the outer wall 5 of the coil. The steam trap may be adapted if desired for use with a separating system operating at sub-atmospheric pressure by the addition of a barometric column and a vacuum pump.

The baffle 9 as described above may be replaced if desired. For example, the section of the coil might be increased at points of withdrawal of the denser fluid to form a pocket and the normal section of the coil might be abruptly resumed after the point of connection of the withdrawal pipe. Such an arrangement is illustrated in Figures 5 and 6 in which the withdrawal pipe 6a connects with the trough 4a and forms an extension of the lower wall of the coil as it increases in section.

When the steam which is being purified is to be used again in steam form, it is preferable to avoid the condensation of it during its travel through the coil. For this reason the apparatus is thoroughly insulated with the exception of the steam trap. In some cases, however it is preferable to sacrifice a small portion of the steam and permit a certain amount of condensation in the last turns of the coil since the condensed water will carry along the last particles of oil and thus facilitate extraction of the oil.

I have described what I believe to be the best embodiments of my invention. I do not wish, however, to be confined to the embodiments shown, but what I desire to cover by Letters Patent is set forth in the appended claims.

1. In an apparatus for separating entrained liquid from a gas, in combination, a spiral coil through which the mixed fluids may be propelled to develop a centrifugal separating component, said coil being of non-circular cross section and provided at the lower outer side thereof with a trough toward which the entire outer wall slopes in a downward and outward direction.

2. In an apparatus for separating entrained liquid from a gas, in combination, a spiral coil through which the mixed fluids may be propelled to develop a centrifugal separating component, said coil being of non-circular cross section and provided at the lower outer side thereof with a restricted trough and means communicating with said trough at spaced points for withdrawing the separated liquid from the coil.

3. In an apparatus for separating entrained liquid from a gas, in combination, a spiral coil through which the mixed fluids may be propelled to develop a centrifugal separating component, said coil being of non-circular cross section and provided at the lower outer side thereof with a restricted trough and having a downwardly and outwardly extending outer wall leading toward said trough and disposed to intersect the resultant of gravity and centrifugal force at a slight acute angle, whereby capillary force is utilized to facilitate the separation of the entrained liquid.

4. In an apparatus for separating entrained liquid from a gas, in combination, a spiral coil through which the mixed fluids may be propelled to develop a centrifugal separating component, said coil being of non-circular cross section and provided at the lower outer side thereof with a restricted trough, having outlets at intervals along the trough for discharging the separated liquid, and baffles intersecting the trough just below the outlets to promote the collection and diversion of the liquid at each outlet.

5. In an apparatus for separating entrained liquid from a gas, in combination, a spiral coil through which the mixed fluids may be propelled to develop a centrifugal separating component, said coil being of non-circular cross section and provided at the lower outer side thereof with a restricted trough, and having outlets at intervals along the trough for discharging the separated liquid, and baffles in the form of thin plates intersecting the trough at the lower sides of the outlets and extending upward along the outer section of the coil wall.

6. In an apparatus for separating entrained liquid from a gas, in combination, a spiral coil through which the mixed fluids may be propelled to develop a centrifugal separating component, said coil being of non-circular cross section and provided at the lower side thereof with a restricted trough and outlet pipes communicating at intervals with the trough, each pipe extending from the trough in the direction of liquid flow at a slight angle to the trough so that the pipe forms in effect a temporary enlargement of the trough which is abruptly terminated by the resumption of the normal cross section of the trough.

JEAN LOUMIET et LAVIGNE.